Figure 4:
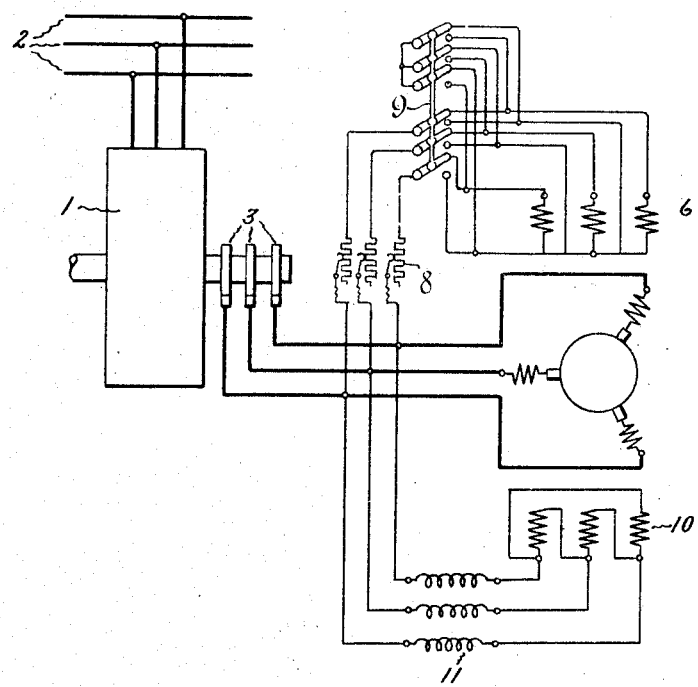

June 14, 1927.  W. SEIZ  1,632,682
SPEED CONTROL SYSTEM
Filed Jan. 12, 1924   2 Sheets-Sheet 1
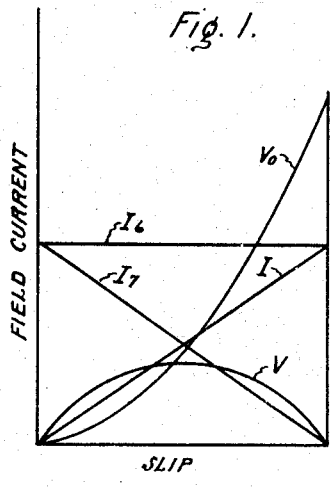
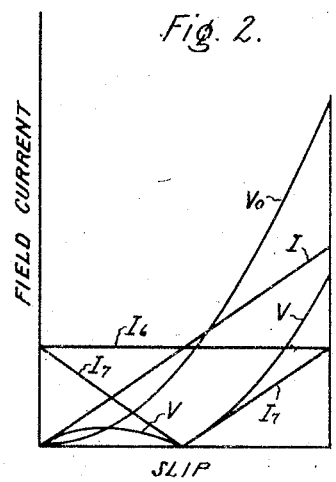
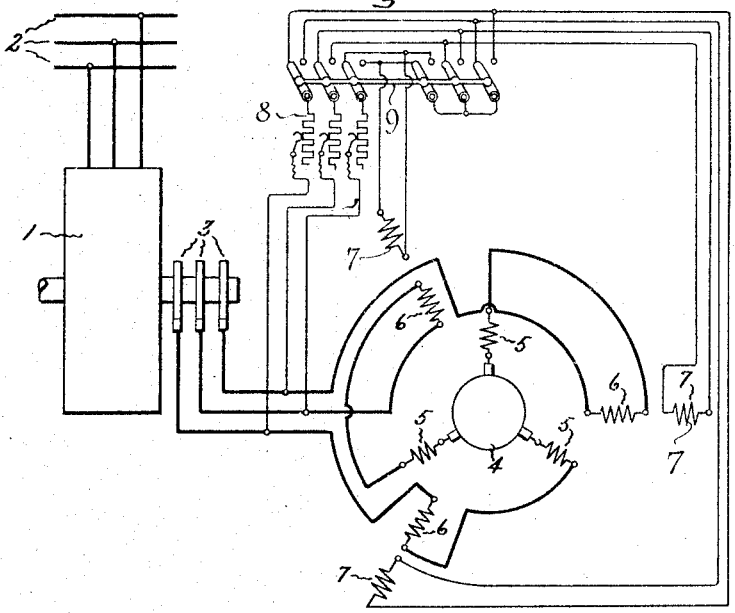
Inventor:
Walter Seiz,
by Alexander S. Lunt
His Attorney.

Patented June 14, 1927.

1,632,682

UNITED STATES PATENT OFFICE.

WALTER SEIZ, OF BADEN, SWITZERLAND, ASSIGNOR TO GENERAL ELECTRIC COMPANY, A CORPORATION OF NEW YORK.

SPEED-CONTROL SYSTEM.

Application filed January 12, 1924, Serial No. 685,781, and in Germany January 18, 1923.

My invention relates to speed control systems in which an induction motor is concatenated with a commutator exciting machine, and has for its object the provision of means for controlling in a simple and effective manner the magnitude of the voltage injected into the secondary circuit of the motor by the commutator machine.

It is well known that the speed of an induction motor may be controlled by injecting into its secondary circuit a variable voltage which for subsynchronous operation is opposed to the slip voltage and for supersynchronous operation is in phase with the slip voltage. It has been proposed to produce this variable voltage by concatenating with the induction motor a commutator machine having its field windings connected to the slip rings of the main motor through an adjustable rheostat. This arrangement is objectionable in that the losses in the exciter circuit are large, especially when the resistance of the rheostat is several times larger than the reactance of the exciting winding. The use of a rheostat in the exciter field circuit may be avoided by the use of a series field winding but this scheme is impractical because of the large and expensive switching apparatus required. It is of course possible to use, in conjunction with an exciter field winding connected to the main motor slip rings through an adjustable rheostat, an additional field winding for supplying a part of the field excitation of the exciter thus reducing the resistance losses in the field circuit. This arrangement, however, makes it impossible to bring the motor up to near synchronous speed because of the fact that due to the unregulated or fixed field winding of the commutator machine, there is always produced a voltage opposed to the slip voltage of the main motor. I propose to overcome this difficulty by so associating the regulated and unregulated field windings of the commutator machine that, throughout a part of the range of operation at least, the fluxes which they produce are opposed. With this arrangement the voltage of the commutator machine may be reduced to zero simply by increasing the flux of the regulated field winding until it is equal to that of the unregulated field winding.

My invention will be better understood on reference to the following description when considered in connection with the accompanying drawing and its scope will be pointed out by the appended claims.

Referring now to the drawing, Figs. 1 and 2 are diagrams illustrating certain operating characteristics of a speed control system in which my invention has been embodied; Fig. 3 shows a system in which my invention has been embodied; and Fig. 4 shows a modification thereof.

Fig. 3 shows an induction motor having its primary winding connected to a polyphase source of current 2 and its secondary winding connected through slip rings 3 to a regulating machine provided with a commutator winding 4, compensating windings 5, series field windings 6 and shunt field windings 7 connected to the slip rings 3 through an adjustable resistor 8 and reversing switch 9.

Fig. 4 shows a system which differs from that shown by Fig. 3 in that the series field windings 6 are replaced by delta-connected field windings 10 connected to the slip rings 3 through reactors 11, the purpose of which will be subsequently explained.

If, in Fig. 3, the fixed or unregulated field windings 6 are wound to supply only a part, for example one-half, of the total flux of the machine, the regulated field winding 7 is required to supply a flux either to assist or oppose that of the unregulated field winding 6, depending on the speed desired, and the switch 9 must therefore be provided for reversing its connections. Under these conditions the maximum current of the winding 6 will be comparatively small as will be apparent on reference to Fig. 2 in which slip is plotted as abscissæ and field current as ordinates, the various values of the current of the field winding 7 being indicated by the curve $I_7$, those of the field winding 6 being represented by the curve $I_6$, the actual losses in the rheostat 8 being indicated by the curve V, the losses which would occur in the rheostat 8 in the absence of the winding 6 being indicated by the curve $V_0$, and the values of total field current of the commutator machine being indicated by the curve I. A comparison of the curves $V_0$ and V readily shows that the ohmic losses of the regulated field winding are materially reduced by the differential arrangement of the windings 6 and 7 and that the field current required to be carried by the winding 7 may, when the fixed winding is designed to produce only half the total flux, be reduced to one-half its maximum value when the fixed winding is omitted.

Fig. 1 differs from Fig. 2 in that it shows the conditions which obtain when the windings 6 and 7 are differentially wound and are each designed to produce a flux equal to the total flux of the commutator machine. It will be observed from curves V and $V_0$ that in this case, while the maximum current $I_r$ of the field winding 7 is equal to the total exciting current I of the machine, the ohmic losses of the regulated field circuit are much less than they would be were the winding 6 omitted. For large slips these losses are also considerably less than in the case where the winding 6 is designed to produce one-half the total flux of the machine. The winding 6 may of course be designed to produce any desired percentage of the total flux and the smallest ohmic loss in the regulated field circuit thus be obtained at the speed at which the motor is most commonly operated.

While the winding 6 has been referred to as the fixed or unregulated field winding, it should be understood that if desired the flux produced by this winding may be regulated or reversed and smaller changes in flux be produced by manipulation of the rheostat in circuit with the winding 7. If the unregulated winding is connected as shown in Fig. 3, its flux will of course vary with the slip of the main motor. At large slip therefore the flux produced by the fixed winding is smaller than at small slip when the secondary frequency is low. In accordance with my invention this disadvantage may be avoided by replacing the series field winding by a shunt field winding 10 connected to the slip rings of the main motor through reactors 11 as indicated in Fig. 4. Under these conditions the fixed winding produces a flux of approximately constant value, the reactors serving to cut down the flux when the slip is high. The use of the shunt fixed winding also has the additional advantage that the speed may be adjusted with no load on the motor, whereas with the series field winding speed regulation can be effected only when there is a load on the main motor.

It will be obvious to those skilled in the art that my invention may be used in connection with well known means for power factor correction, as for example by supplying an additional winding on the commutator machine, magnetically independent of the circuits of the main exciter windings, with current of suitable magnitude and phase, or by adjusting the phase relationship of the currents in the regulated and unregulated windings in addition to the regulation required exclusively for speed regulation, but these arrangements, being old and well known, it is not necessary to describe them specifically.

I have explained my invention by illustrating and describing a certain specific embodiment thereof, but it will be readily understood by those skilled in the art that the invention may be embodied in many other forms than that shown and described. I, accordingly, do not wish to be restricted to the particular forms of construction disclosed herein by way of example for the purpose of setting forth my invention in accordance with the patent statutes. The terms of the appended claims are, therefore, not restricted to the precise structure disclosed, but are intended to cover all changes and modifications within the spirit and scope of my invention.

What I claim as new and desire to secure by Letters Patent of the United States, is,—

1. A speed control system wherein an induction motor is concatenated with a commutator machine for regulating its speed, characterized by the fact that said commutator machine is provided with regulated and unregulated exciting field windings as distinguished from compensating windings for producing opposed fluxes.

2. A speed control system comprising an induction motor, and a regulating machine concatenated with said induction motor for regulating its speed, said regulating machine being provided with an unregulated field winding arranged to produce flux in one direction and with a regulated field winding connected to the slip rings of said induction motor for producing a flux in the opposite direction.

3. A speed control system comprising an induction motor, a commutator machine provided with regulated and unregulated field windings for producing opposed fluxes and concatenated with said induction motor for controlling its speed, means for regulating the flow of electricity in said regulated winding, and means connecting said regulated winding with the secondary circuit of said induction motor.

4. A speed control system comprising an induction motor, a commutator machine concatenated with said induction motor for controlling its speed and provided with regulated and unregulated field windings operatively associated with the secondary circuit of said induction motor for producing opposed fluxes, means for adjusting the flow of electricity in said regulated winding, and means permanently associated with said regulating winding for rendering the flux which it produces independent of the slip of said induction motor.

5. A speed control system comprising an induction motor, a commutator machine concatenated with said induction motor for controlling its speed and provided with regulated and unregulated field windings operatively associated with the secondary winding of said induction motor for producing opposed fluxes, a resistor for controlling the flow of electricity in said regulated field winding, and a reactor for rendering flow of electricity in said unregulated winding approximately independent of the slip of said induction motor.

In witness whereof, I have hereunto set my hand this 20th day of December, 1923.

WALTER SEIZ.